United States Patent [19]

Sakamoto et al.

[11] 4,019,130
[45] Apr. 19, 1977

[54] METHOD FOR MEASURING WEAR OF COOLING CELL ASSEMBLY

[75] Inventors: Yoshiyasu Sakamoto, Osaka; Tatsuo Hiroshima, Nishinomiya; Toshihiko Sakai; Tetuo Asano, both of Osaka, all of Japan

[73] Assignee: Sumitomo Metal Industries, Ltd., Osaka, Japan

[22] Filed: Aug. 26, 1975

[21] Appl. No.: 607,905

[30] Foreign Application Priority Data

Sept. 3, 1974 Japan ............................ 49-101024

[52] U.S. Cl. ............................................ 324/34 R
[51] Int. Cl.² ....................................... G01R 33/12
[58] Field of Search ............... 324/34 R, 34 TK, 37

[56] References Cited
FOREIGN PATENTS OR APPLICATIONS 583,593  9/1959  Canada ................................ 324/37

*Primary Examiner*—Robert J. Corcoran
*Attorney, Agent, or Firm*—Wenderoth, Lind & Ponack

[57] ABSTRACT

In a high-temperature furnace such as a heating furnace, a melting furnace or a blast furnace, a cooling cell assembly of a ferromagnetic material such as iron is used in the furnace wall. The thickness of the cooling cell assembly can be detected by winding primary and secondary windings about an iron core, passing an alternating current through the primary winding and inserting a sensor in an inspection hole for detecting the current or voltage induced in the secondary winding, forming a magnetic circuit in the sensor and a portion of the furnace wall, and detecting variations in magnetic permeability between the cooling cell assembly and mortar, refractory bricks or air gaps.

4 Claims, 6 Drawing Figures

METHOD FOR MEASURING WEAR OF COOLING CELL ASSEMBLY

BACKGROUND OF THE INVENTION:

The present invention relates to a method for measuring the thickness of the wall of a high-temperature furnace.

In a high-temperature furnace such as for refining, melting or heating metals during the manufacture thereof, it has been a common practice to provide a cooling cell assembly for protecting the furnace body inside the outermost iron shell with a layer of mortar functioning as a cushion between the shell and the cooling cell assembly, to circulate cooling water through the cooling cell assembly, and further to provide a wall of refractory bricks in the furnace inside the cooling cell assembly so as to keep the cooling cell assembly from being exposed directly to a high temperature. In such a furnace, however, after a long time of operation the refractory bricks are occasionally damaged to expose the cooling cell assembly to the high temperature within the furnace. In such cases, the cooling cell assembly itself may be damaged by melting due to the high temperature or by wearing due to the solid bodies within the furnace. In the high-temperature furnace, accordingly, it is very important and indispensable to monitor the wear of the cooling cell assembly from time to time not only for the smooth operation of the furnace but also for prevention of damage to the furnace body.

The heretofore employed method for monitoring the wear of the cooling cell assembly was to insert a sounding rod into an inspection hole in the wall of the high-temperature furnace to thereby measure the thickness of the cooling cell assembly or the thickness of the entire furnace wall. Since the inspection hole had to be sealed with mortar during furnace operation and the mortar had to be removed for measurement, it was sometimes difficult to determine the position of the end face of the inspection hole when the mortar was not sufficiently removed and deposits on the furnace wall tended to interfere with accurate measurement. Another disadvantage of the prior art method was that the measurement according to the method required a special skill and a keen sense on the part of the measurer.

SUMMARY OF THE INVENTION:

Accordingly, the object of the present invention is to provide a method for automatically measuring the precise thickness and amount of wear of the cooling cell assembly independent of the effects of deposits on the furnace wall.

The method according to the present invention, taking note of the fact that cooling cells are generally made of ferromagnetic materials such as iron, contemplates measuring the thickness of the cooling cell assembly by detecting the difference in magnetic permeability between the cooling cell assembly and mortar, refractory bricks or air gaps.

BRIEF DESCRIPTION OF THE DRAWINGS:

The invention will be better understood from the following description taken in connection with the accompanying drawings in which.

Figure 1:
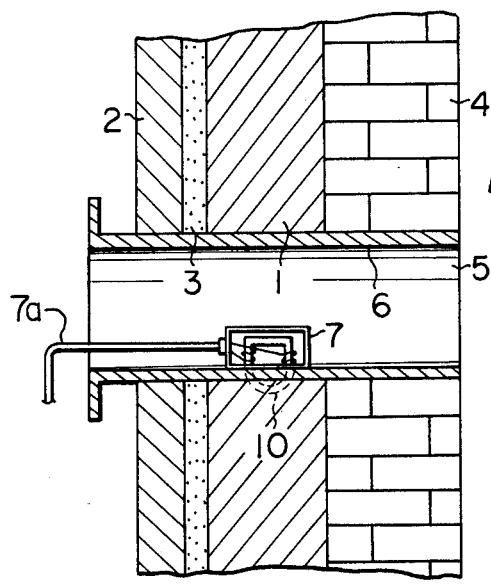
FIG. 1 is a fragmentary sectional view of the wall of a high-temperature furnace in which the method according to the present invention can be practiced.

DESCRIPTION OF THE PREFERRED EMBODIMENTS:

The high-temperature furnace shown in FIG. 1 has a wall structure the same as that of prior art furnace except in the portion constituting the inspection hole. Namely, a cooling cell assembly 1 for protecting the body of the high-temperature furnace is disposed inside an iron shell 2 with a mortar layer 3 as a cushion therebetween and is cooled by cooling water supplied thereto through a piping from outside. In the furnace inside the cooling cell assembly 1 there is provided a refractory layer 4 for keeping the cooling cell assembly 1 from being exposed directly to the high temperature within the furnace.

Figure 2:
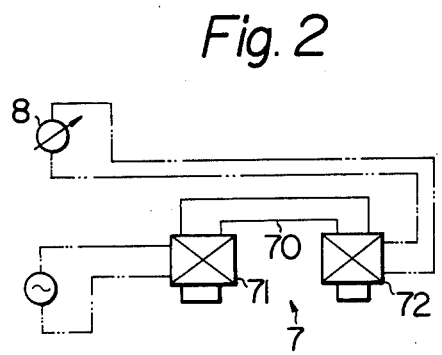
FIG. 2 is a schematic diagram of an embodiment of the sensor for use in practicing the method according to the present invention.

In the embodiment of FIG. 1, while an inspection hole 5 is shown as having the peripheral wall thereof protected by a protecting tube 6, it is, of course, within the scope of the present invention to provide an inspection hole without the protecting tube. According to the present invention, the inspection hole 5 is provided through a suitable position of the furnace wall, and a sensor 7 formed by winding wires about, for example, a U-shaped iron core is made to move within said inspection hole 5 along the wall thereof. An embodiment of the sensor 7, as shown in FIG. 2, comprises a U-shaped iron core 70 the opposite ends of which are provided respectively with a primary winding 71 and a secondary winding 72. The primary winding 71 is connected to a source of alternating current while the secondary winding 72 is connected to a voltmeter 8.

Figure 3:
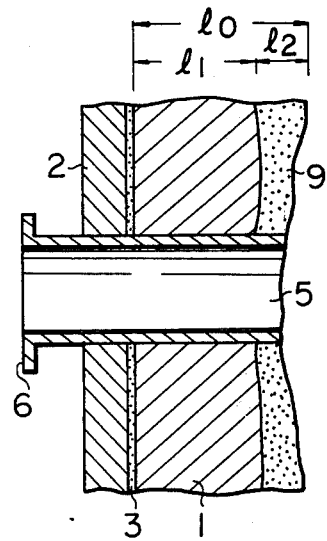
FIG. 3 is a fragmentary sectional view of the wall of a furnace wherein a portion of the cooling cell assembly is considerably worn.
Figure 4:
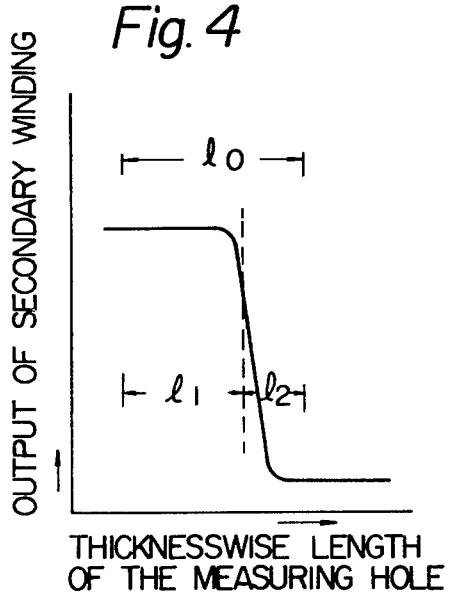
FIG. 4 is a diagram of the output from the secondary side of the sensor obtained from the furnace wall shown in FIG. 3.

For measurement, the sensor 7 is slidingly moved circumferentially and axially along the wall of the inspection hole 5 while supplying an alternating current to the primary side of the sensor 7. An alternating magnetic field produced by the primary winding 71 alternates between it and the secondary winding 72 through a magnetic circuit 10 to induce a certain output in the secondary side. Since the output in the secondary side shows a marked change between the position when the sensor is aligned with the cooling cell assembly 1 of ferromagnetic material such as iron and when the sensor is aligned with the refractory layer 4 or mortar layer 3 both of non-ferromagnetic materials, detection is carried out at a plurality of points along the inner circumferential surface of the inspection hole, for example four circumferential points separated by one-fourth of a full circle, and points along the inspection hole at which the output markedly drops, are detected by voltmeter 8 and located as the positions of the end face of the cooling cell assembly at each of the predetermined circumferential points. For example, when the cooling cell assembly 1 is worn away at the side of the furnace by an amount $l_2$ and a layer of deposits 9 such as mortar exists on said side as shown in FIG. 3, the output obtained in the secondary winding drops suddenly at the point where the sensor 7 is at the junction of the wall 1 and the layer of deposits 9, as shown in FIG. 4. The length of the rod 7a, which is in the hole 5, less the thickness of the shell 2 and mortar layer 3, which are shown, thus indicates the exact thickness $l_1$ of the remaining wall of the cooling cell assembly. Therefore, according to the present invention, the difference between the initial thickness $l_0$ of the cooling cell assembly and the thickness $l_1$ of the remaining wall of the cooling cell assembly in the worn condition, i.e. $l_2$ can be quantitatively determined to be the amount of wear of the cooling cell assembly.

Figure 5:
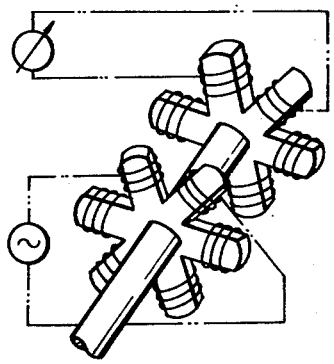
FIGS. 5 and 6 are perspective views of other embodiments of the sensor according to the present invention.
Figure 6:
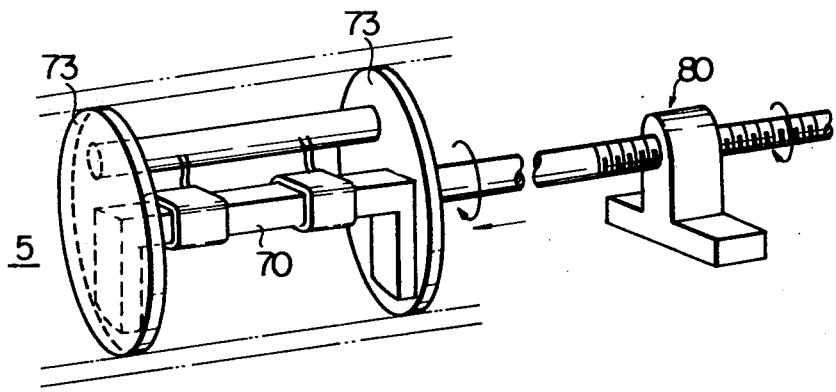

In the above embodiment, the sensor 7 has been described as having the U-shaped core. In said embodiment, however, it is possible that the degree of wear of the inner surface of the inspection hole on which the sensor is slidingly moved varies depending upon the circumferential position in the hole. Accordingly, the sensor 7 is slidingly moved circumferentially and axially along the wall of the inspection hole 5 so as to determine the position of the end face of the furnace wall at the predetermined circumferential positions of the inspection hole. However, by using a set of star-shaped cores as shown in FIG. 5, it is possible to obtain a mean value of the amount of wear in the circumferential direction of the inspection hole without the necessity of rotating the sensor circumferentially of the inspection hole. Alternately, as shown in FIG. 6, by mounting the U-shaped iron core 70 between two discs 73 which are fixed to a screw feed mechanism 80 the U-shaped iron core 70 can be moved helically within the inspection hole 5.

From the foregoing description those skilled in the art will readily realize that the present invention provides a method for efficiently and accurately measuring the amount of wear of the cooling cell assembly with a minimum modification in the wall structure of the heretofore employed high-temperature furnace and for increasing the efficiency and safety of the high-temperature furnace operation.

While we have shown and described specific embodiments of our invention, it will be understood that these embodiments are merely for the purpose of illustration and description and that various other forms may be devised within the scope of our invention, as defined in the appended claims.

We claim:

1. A method for measuring the amount of wear of a high-temperature furnace cooling cell assembly of a ferromagnetic material, comprising the steps of:
   providing an inspection hole through a portion of the furnace wall into the inside of the furnace;
   moving a sensor consisting of an iron core having primary and secondary windings wound thereabout along the surface of the wall which defines said inspection hole while supplying an alternating current to the primary winding of said sensor;
   measuring the variation in output voltage of the secondary winding of said sensor and when the output voltage drops abruptly, measuring the length of the sensor inserted into the hole to thereby determine the thickness of the cooling cell assembly; and
   comparing the thickness of the cooling cell assembly at the time of the measurement with the initial thickness of the cooling cell assembly for determining the amount of wear of the cooling cell assembly.

2. A method according to claim 1 in which said sensor includes a U-shaped iron core.

3. A method according to claim 1 in which said sensor includes a set of iron cores spaced along the length of the hole and connected to each other by a core portion, and each having a plurality of arms projecting radially thereof, said arms of one core having the primary winding thereon and the arms of the other core having the secondary winding thereon.

4. A method according to claim 1 in which said sensor includes a core mounting means movable along said hole and rotatable within the hole around the axis of the hole, and an iron core mounted on said mounting means adjacent the surface of the wall defining said hole.

* * * * *